United States Patent
Hamada et al.

(10) Patent No.: US 11,038,429 B2
(45) Date of Patent: Jun. 15, 2021

(54) INSULATION-TYPE SWITCHING POWER SUPPLY

(71) Applicant: FDK CORPORATION, Tokyo (JP)

(72) Inventors: Kenji Hamada, Tokyo (JP); Tadashi Sato, Tokyo (JP); Norio Fukui, Tokyo (JP)

(73) Assignee: FDK CORPORATION, Tokyo (JP)

(*) Notice: Subject to any disclaimer, the term of this patent is extended or adjusted under 35 U.S.C. 154(b) by 115 days.

(21) Appl. No.: 16/498,573

(22) PCT Filed: Jan. 18, 2018

(86) PCT No.: PCT/JP2018/001296
§ 371 (c)(1),
(2) Date: Sep. 27, 2019

(87) PCT Pub. No.: WO2018/179694
PCT Pub. Date: Oct. 4, 2018

(65) Prior Publication Data
US 2021/0119543 A1    Apr. 22, 2021

(30) Foreign Application Priority Data
Mar. 29, 2017   (JP) .............................. JP2017-065986

(51) Int. Cl.
*H02M 3/335*   (2006.01)
*H02M 1/40*    (2007.01)

(52) U.S. Cl.
CPC ......... *H02M 3/33523* (2013.01); *H02M 1/40* (2013.01)

(58) Field of Classification Search
CPC ....... H02M 3/33523; H02M 1/40; H02M 1/08
See application file for complete search history.

(56) References Cited

U.S. PATENT DOCUMENTS 4,607,210 A    8/1986  Ohms et al.
4,862,339 A *  8/1989  Inou .................. H02M 1/08
                                              363/21.07
(Continued)

FOREIGN PATENT DOCUMENTS

EP    1257046 A2    11/2002
JP    S60249869 A   12/1985
(Continued)

OTHER PUBLICATIONS

English translation of International Search Report dated Feb. 20, 2018, for corresponding PCT Application No. PCT/JP2018/001296.
(Continued)

*Primary Examiner* — Kyle J Moody
(74) *Attorney, Agent, or Firm* — Kinney & Lange, P.A.

(57) ABSTRACT

An insulation-type switching power supply according to the present invention includes: a PWM control circuit that generates and outputs a PWM pulse and a PWM pulse respectively by alternately extracting pulses of a PWM control pulse signal at a field-effect transistor in a flyback converter circuit; a pulse transformer; a bidirectional excitation circuit that excites a primary winding of the pulse transformer in the forward direction using the PWM pulse and excites the primary winding of the pulse transformer in the reverse direction using the PWM pulse; and a switching circuit that generates a pulse signal by inverting a negative pulse of a pulse signal, induced in a secondary winding of the pulse transformer, to a positive pulse and switches the field-effect transistor by using the generated pulse signal.

12 Claims, 2 Drawing Sheets

(56) References Cited

U.S. PATENT DOCUMENTS

| | | | |
|---|---|---|---|
| 5,498,995 A | | 3/1996 | Szepesi et al. |
| 9,819,274 B2* | | 11/2017 | Quigley ............ H02M 3/33546 |
| 9,960,664 B2* | | 5/2018 | Lin ........................ H02M 1/08 |
| 2016/0329819 A1 | | 11/2016 | Chen et al. |
| 2016/0344296 A1* | | 11/2016 | Luo ................... H02M 3/33592 |
| 2019/0296649 A1* | | 9/2019 | Graves .................... H02M 1/34 |

FOREIGN PATENT DOCUMENTS

| | | |
|---|---|---|
| JP | S63121468 A | 5/1988 |
| JP | S63299772 A | 12/1988 |
| JP | H0833341 A | 2/1996 |
| JP | 2007020395 A | 1/2007 |
| WO | 2010092704 A1 | 8/2012 |

OTHER PUBLICATIONS

Extended European Search Report dated Oct. 27, 2020, for corresponding European Application No. 18778197.6.

* cited by examiner

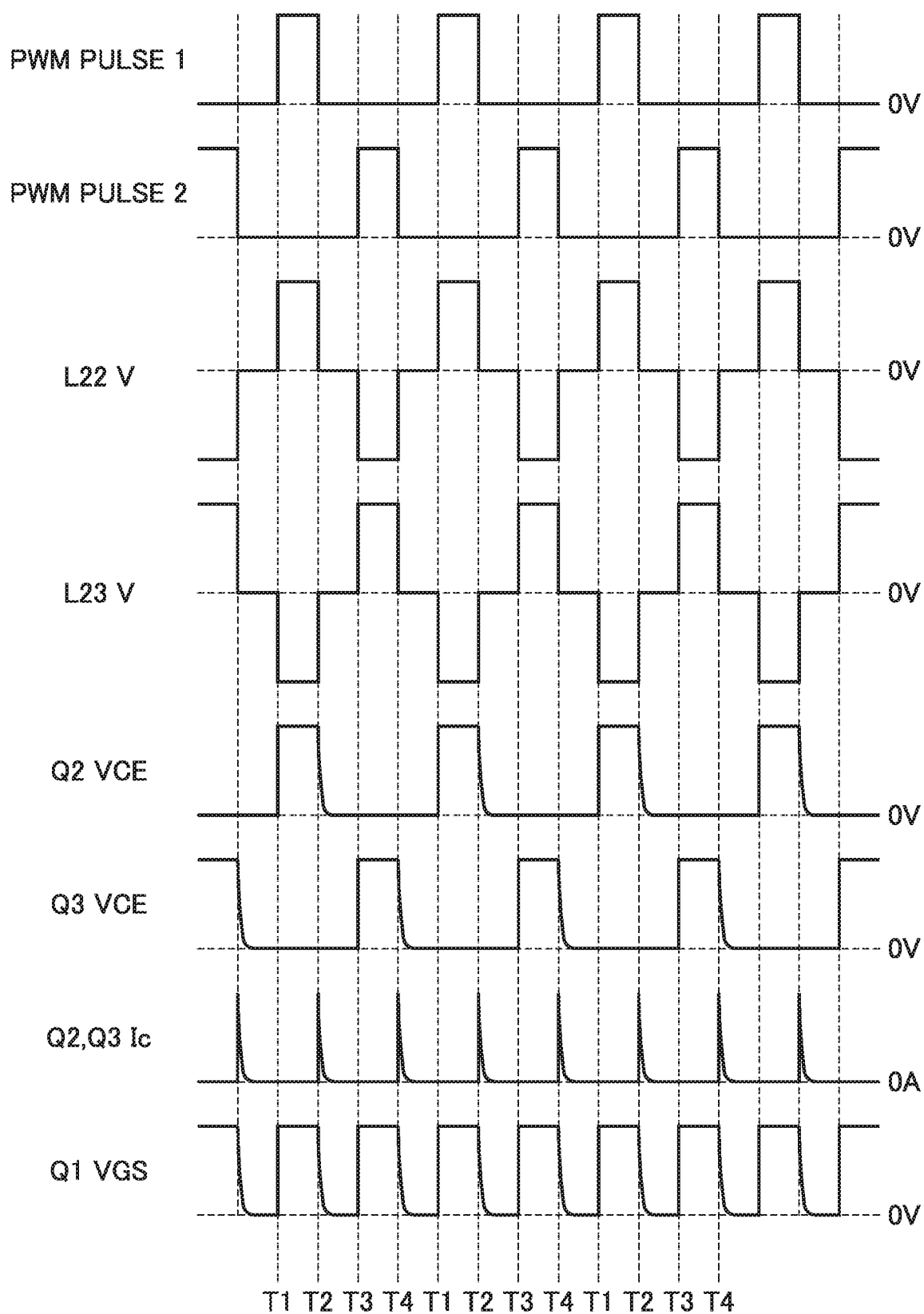

INSULATION-TYPE SWITCHING POWER SUPPLY

CROSS-REFERENCE TO RELATED APPLICATION(S)

The present application is the national phase of PCT Application No. PCT/JP2018/001296 filed on Jan. 18, 2018, which in turn claims priority to Japanese Application No. 2017-065986 filed on Mar. 29, 2017, both of which are incorporated by reference herein in their entireties.

TECHNICAL FIELD

The present disclosure relates to an insulation-type switching power supply provided with a flyback converter circuit.

BACKGROUND ART

For performing constant voltage control of an output voltage, a conventional insulation-type switching power supply provided with a flyback converter circuit feeds back an output voltage on the secondary side to the primary side via an insulating circuit such as a photocoupler or a transformer and controls a switching duty ratio of a switching element of the flyback converter circuit in a pulse width modulation (PWM) control circuit provided on the primary side (e.g., see Patent Document 1 or 2).

PRIOR ART DOCUMENTS

Patent Documents

Patent Document 1: Japanese Patent Laid-Open No. 08-033341
Patent Document 2: Japanese Patent Laid-Open No. 2007-020395

However, since the above prior art is configured to have the PWM control circuit provided on the primary side, it is necessary to separately provide a constant voltage power supply for the PWM control circuit on the primary side where a high voltage is often handled, thereby causing a problem of difficulty in reducing the size and cost of the circuit. Hence it is conceivable that the PWM control circuit is provided on the secondary side, and a PWM control pulse is transmitted to the primary side via the transformer.

However, when the PWM control circuit is provided on the secondary side and the PWM control pulse is transmitted to the primary side via the transformer, a reset circuit for resetting the transformer is required. Further, when the switching duty ratio of the PWM control pulse exceeds 50%, there is a risk that the reset circuit may not be able to reset the transformer, and magnetic saturation, a reverse electromotive voltage, or the like may occur to cause damage on a peripheral circuit or the like. In this case, such a risk of the occurrence of the magnetic saturation, the reverse electromotive voltage, or the like can be reduced by, for example, increasing the size of the transformer and a semiconductor element which transmit the PWM control pulse to the primary side. However, there is also a risk that the use of a large-sized transformer or the like may make it difficult to reduce the size and cost of the circuit and may cause an increase in loss and a decrease in power conversion efficiency. On the other hand, when the switching duty ratio of the PWM control pulse is limited up to 50% so as to avoid such a situation as thus described, it is impossible to take advantage of the flyback converter circuit which is operable at a switching duty ratio beyond 50%.

The present disclosure has been made in view of such circumstances, and an object of the present disclosure is to provide, at low cost, an insulation-type switching power supply that can operate at a switching duty ratio beyond 50% and has a small size and high efficiency.

SUMMARY

An aspect of the present disclosure is an insulation-type switching power supply including: a flyback converter circuit; and a feedback control circuit that performs pulse width modulation (PWM) control of a switching element in the flyback converter circuit based on an output voltage of the flyback converter circuit. The feedback control circuit includes a PWM control circuit that generates and outputs a first PWM control pulse signal and a second PWM control pulse signal respectively by alternately extracting pulses of a PWM control pulse signal of the switching element, a transformer, a bidirectional excitation circuit that excites a primary winding of the transformer in a forward direction using the first PWM control pulse signal and excites the primary winding of the transformer in a reverse direction using the second PWM control pulse signal, and a switching circuit that generates a pulse signal by inverting a negative pulse of a pulse signal, induced in a secondary winding of the transformer, to a positive pulse and switches the switching element by using the generated pulse signal.

As thus described, a first PWM control pulse signal and a second PWM control pulse signal are generated by alternately extracting pulses of the PWM control pulse signal, and the primary winding of the transformer is alternately excited in a bidirectional manner using the first PWM control pulse signal and the second PWM control pulse signal. Then, a pulse signal is generated by inverting a negative pulse of a pulse signal, induced in the secondary winding of the transformer, to a positive pulse, so that the same pulse signal as the PWM control pulse signal generated by the PWM control circuit is obtained. Thereby, the PWM control pulse signal, generated by the PWM control circuit on the secondary side (output side) of the flyback converter circuit, is transmitted to the primary side (input side) of the flyback converter circuit via the transformer to enable the feedback control of the flyback converter circuit. In the present disclosure, since the primary winding of the transformer is alternately excited in the bidirectional manner using the first PWM control pulse signal and the second PWM control pulse signal, a reset circuit for the transformer is not required, and even when the PWM control pulse signal has a switching duty ratio beyond 50%, magnetic saturation, reverse electromotive voltage, or the like does not occur in the transformer.

Therefore, according to the aspect of the present disclosure, it is possible to provide, at low cost, an insulation-type switching power supply that can operate at a switching duty ratio beyond 50% and has a small size and high efficiency.

According to the present disclosure, it is possible to provide, at low cost, an insulation-type switching power supply that can operate at a switching duty ratio beyond 50% and has a small size and high efficiency.

BRIEF DESCRIPTION OF THE DRAWINGS

FIG. 2 is a timing chart illustrating the operation of the insulation-type switching power supply according to the present disclosure.

DETAILED DESCRIPTION

Figure 1:
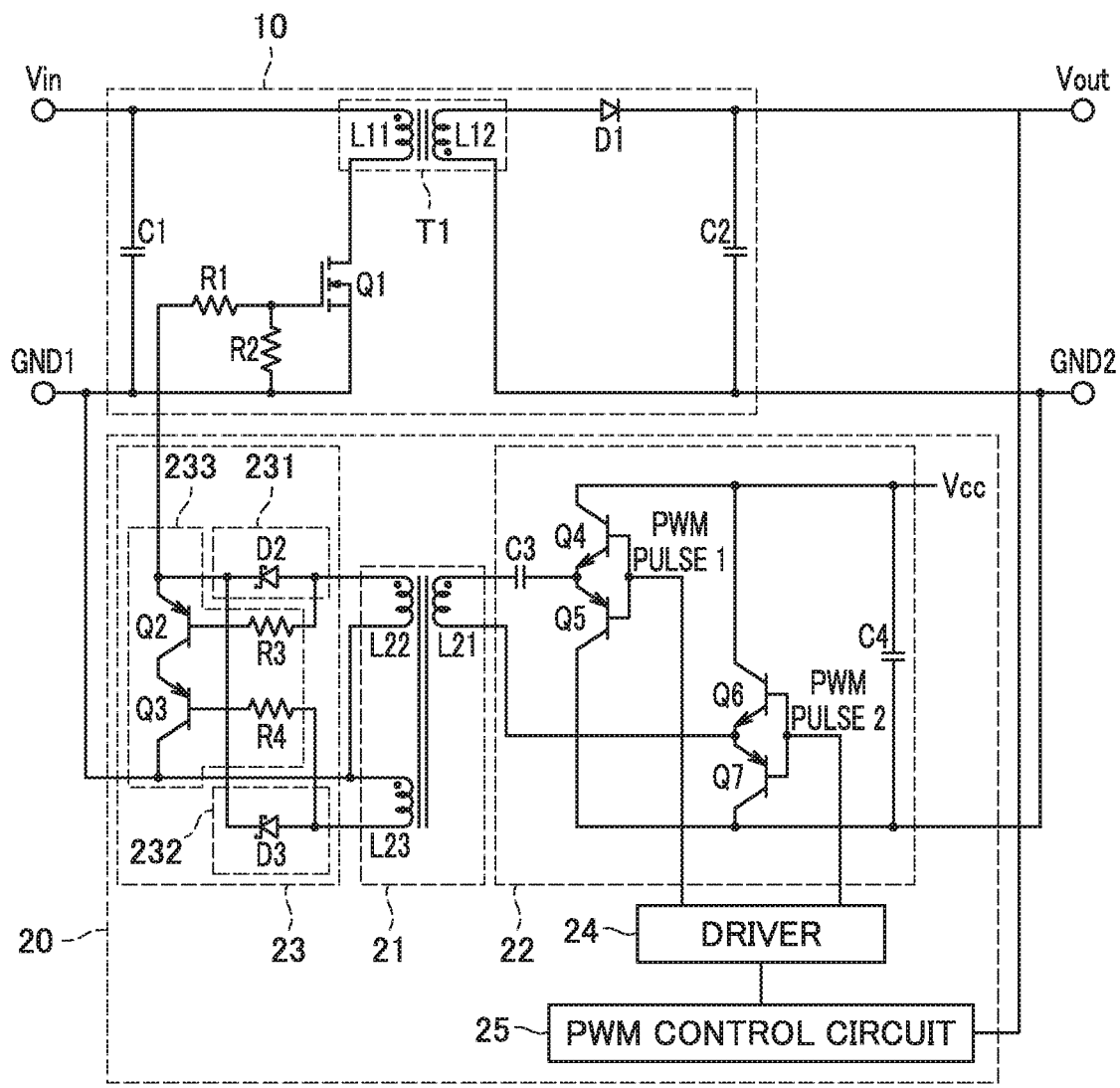
FIG. 1 is a circuit diagram of an insulation-type switching power supply according to the present disclosure.

Hereinafter, one or more embodiments of the present disclosure will be described with reference to the accompanying drawings. The present invention is not particularly limited to the embodiment(s) described below, but needless to say, various modifications are possible within the scope of the invention described in the claims.

The configuration of the insulation-type switching power supply according to the present disclosure will be described with reference to FIG. 1.

FIG. 1 is a circuit diagram of an insulation-type switching power supply according to the present disclosure.

The insulation-type switching power supply according to the present disclosure is provided with a flyback converter circuit 10 and a feedback control circuit 20.

The flyback converter circuit 10 is a flyback insulation-type DC-DC converter and includes an insulating transformer T1, a field-effect transistor Q1, resistors R1, R2, capacitors C1, C2, and a diode D1.

The insulating transformer T1 includes a primary winding L11 and secondary winding L12. The winding start of the primary winding L11 of the insulating transformer T1 is connected to an input Vin, and the winding end of the primary winding L11 is connected to the drain of the field-effect transistor Q1. Each of the resistor R1 and the resistor R2 has one end connected to the gate (control terminal) of the field-effect transistor Q1. The other end of the resistor R1 is connected to the feedback control circuit 20. The other end of the resistor R2 is connected to a primary-side ground GND1. One end of the capacitor C1 is connected to the input Vin, and the other end of the capacitor C1 is connected to the primary-side ground GND1. The source of the field-effect transistor Q1 is connected to the primary-side ground GND1.

The winding start of the secondary winding L12 of the insulating transformer T1 is connected to a secondary-side ground GND2, and the winding end of the secondary winding L12 is connected to the anode of the diode D1. The cathode of the diode D1 is connected to an output Vout. One end of the capacitor C2 is connected to the output Vout, and the other end of the capacitor C2 is connected to the secondary-side ground GND2.

In the flyback converter circuit 10 with such a configuration, power is stored into the insulating transformer T1 while the field-effect transistor Q1 as a "switching element" is on. Then, at the timing of turning-off of the field-effect transistor Q1, the power stored in the insulating transformer T1 is output by the counter electromotive force of the insulating transformer T1.

The feedback control circuit 20 performs the PWM control of the field-effect transistor Q1 in the flyback converter circuit 10 based on the voltage of the output Vout of the flyback converter circuit 10. The feedback control circuit 20 includes a pulse transformer 21, a bidirectional excitation circuit 22, a switching circuit 23, a driver 24, and the PWM control circuit 25.

The pulse transformer 21 as a "transformer" includes a primary winding L21, a first secondary winding L22, and a second secondary winding L23. The winding end of the first secondary winding L22 and the winding start of the second secondary winding L23 are connected to the primary-side ground GND1.

The bidirectional excitation circuit 22 is a circuit that excites the primary winding L21 of the pulse transformer 21 in the forward direction using the PWM pulse 1 generated by the PWM control circuit 25 and excites the primary winding L21 of the pulse transformer 21 in the reverse direction using the PWM pulse 2, as described later. The bidirectional excitation circuit 22 includes transistors Q4 to Q7 and capacitors C3, C4. The transistors Q4, Q6 are NPN bipolar transistors, and the transistors Q5, Q7 are PNP bipolar transistors.

The collector of the transistor Q4 is connected to an output Vcc of a constant voltage power supply for control (not illustrated). The emitter of the transistor Q4 is connected to the emitter of the transistor Q5. The collector of the transistor Q5 is connected to the secondary-side ground GND2. The base of the transistor Q4 is connected to the base of the transistor Q5, and the point of the connection is connected to the driver 24. The point of connection between the emitter of the transistor Q4 and the emitter of the transistor Q5 is connected to one end of the capacitor C3. The other end of the capacitor C3 is connected to the winding start of the primary winding L21 of the pulse transformer 21.

The collector of the transistor Q6 is connected to the output Vcc. The emitter of the transistor Q6 is connected to the emitter of the transistor Q7. The collector of the transistor Q7 is connected to the secondary-side ground GND2. The base of the transistor Q6 is connected to the base of the transistor Q7, and the point of the connection is connected to the driver 24. The point of connection between the emitter of the transistor Q6 and the emitter of the transistor Q7 is connected to the winding end of the primary winding L21 of the pulse transformer 21. One end of the capacitor C4 is connected to the output Vcc, and the other end of the capacitor C4 is connected to the secondary-side ground GND2.

The switching circuit 23 generates a pulse signal by removing a negative pulse of a pulse signal induced in each of the first secondary winding L22 and the second secondary winding L23 of the pulse transformer 21 and synthesizing a positive pulse, that is, generates a pulse signal by inverting a negative pulse of a pulse signal, induced in the secondary winding of the transformer 21, to a positive pulse, and switches the field-effect transistor Q1 by using the generated pulse signal. Thereby, the PWM control pulse signal, generated by the PWM control circuit 25 on the secondary side (output Vout side) of the flyback converter circuit 10, is transmitted to the primary side (input Vin side) of the flyback converter circuit 10 via the pulse transformer 21 to enable the feedback control of the flyback converter circuit 10. The switching circuit 23 includes a first rectifier circuit 231, a second rectifier circuit 232, and a drawing circuit 233.

The first rectifier circuit 231 is a circuit for half-wave rectifying and outputting a pulse signal induced in the first secondary winding L22, and the first rectifier circuit 231 includes a first rectifier diode D2. The second rectifier circuit 232 is a circuit for half-wave rectifying and outputting a pulse signal, obtained by inverting the polarity of a pulse signal induced in the second secondary winding L23, and the second rectifier circuit 232 includes a second rectifier diode D3. The type of each of the first rectifier diode D2 and the second rectifier diode D3 is not particularly limited so long as being a diode capable of half-wave rectifying a pulse signal, but it is preferable to use a Schottky barrier diode having excellent switching characteristics as in the embodiment.

The anode of the first rectifier diode D2 is connected to the winding start of the first secondary winding L22 of the pulse transformer 21. The anode of the second rectifier diode D3 is connected to the winding end of the second secondary winding L23 of the pulse transformer 21. The cathode of each of the first rectifier diode D2 and the second rectifier diode D3 is connected to the gate of the field-effect transistor Q1 via the resistor R1 of the flyback converter circuit 10. Thereby, a pulse signal to be the logical sum of the output signal of the first rectifier circuit 231 and the output signal of the second rectifier circuit 232 is generated, and the field-effect transistor Q1 is switched using the generated pulse signal.

The drawing circuit 233 is a circuit for drawing the charge of the gate of the field-effect transistor Q1 while the input signal of the first rectifier circuit 231 and the input signal of the second rectifier circuit 232 are both at the low level. The drawing circuit 233 includes transistors Q2, Q3 and resistors R3, R4.

The transistor Q2 as a "first PNP transistor" and the transistor Q3 as a "second PNP transistor" are, for example, PNP bipolar transistors. The base of the transistor Q2 is connected to the winding start of the first secondary winding L22, and the emitter of the transistor Q2 is connected to the gate of the field-effect transistor Q1. The base of the transistor Q3 is connected to the winding end of the second secondary winding L23, and the collector of the transistor Q3 is connected to the primary-side ground GND1. The collector of the transistor Q2 is connected to the emitter of the transistor Q3.

The resistor R3 as a "current-limiting resistor" is a resistor that limits the base current of the transistor Q2. One end of the resistor R3 is connected to the winding start of the first secondary winding L22, and the other end of the resistor R3 is connected to the base of the transistor Q2. The resistor R4 as the "current-limiting resistor" is a resistor that limits the base current of the transistor Q3. One end of the resistor R4 is connected to the winding end of the second secondary winding L23, and the other end of the resistor R4 is connected to the base of the transistor Q3.

Though not illustrated, as a modification of the present disclosure, the base of the transistor Q2 of the drawing circuit 233 may be connected to the winding end of the second secondary winding L23 via the resistor R4, and the base of the transistor Q3 of the drawing circuit 233 may be connected to the winding start of the first secondary winding L22 via the resistor R3. Further, as a modification of the present disclosure, the transistors Q2, Q3 may, for example, be p-channel field-effect transistors.

The driver 24 drives the transistors Q4 to Q7 of the bidirectional excitation circuit 22 based on a control signal output by the PWM control circuit 25. The PWM control circuit 25 is, for example, a known microcomputer control circuit or control integrated circuit (IC). Based on the voltage of the output Vout of the flyback converter circuit 10, the PWM control circuit 25 generates a PWM control pulse signal for switching the field-effect transistor Q1 and generates a PWM pulse 1 (first PWM control pulse signal) and a PWM pulse 2 (second PWM control pulse signal) respectively by alternately extracting pulses of the PWM control pulse signal, to output the generated pulses to the driver 24.

The operation of the insulation-type switching power supply according to the present disclosure will be described with reference to FIG. 2.

FIG. 2 is a timing chart illustrating the operation of the insulation-type switching power supply according to the present disclosure.

During the time when the PWM pulse 1 is at the high level (timing T1 to T2), in the bidirectional excitation circuit 22, the transistor Q4 is in an on-state and the transistor Q5 is in an off-state. Further, since the PWM pulse 2 is at the low level (0 V), during that time, the transistor Q6 is in the off-state and the transistor Q7 is in the on-state. Hence in the primary winding L21 of the pulse transformer 21, an excitation current flows from the winding start to the winding end, and the primary winding L21 is excited in the forward direction. Thereby, the voltage (L22 V (pulse transformer output voltage 1)) of the winding start of the first secondary winding L22 in the pulse transformer 21 becomes a positive pulse voltage. On the other hand, the voltage (L23 V (pulse transformer output voltage 2)) of the winding end of the second secondary winding L23 in the pulse transformer 21 becomes a negative pulse voltage.

While the PWM pulse 1 and the PWM pulse 2 are both at the low level after the shift of the PWM pulse 1 to the low level (timing T2 to T3), in the bidirectional excitation circuit 22, the transistors Q4, Q6 are in the off-state and the transistors Q5, Q7 are in the on-state. Hence the excitation current does not flow in the primary winding L21 of the pulse transformer 21. Thereby, the voltage of the winding start of the first secondary winding L22 in the pulse transformer 21 and the voltage of the winding end of the second secondary winding L23 in the pulse transformer 21 both become 0 V.

During the time when the PWM pulse 2 is at the high level (timing T3 to T4), in the bidirectional excitation circuit 22, the transistor Q6 is in the on-state and the transistor Q7 is in the off-state. Further, since the PWM pulse 1 is at the low level (0 V), during that time, the transistor Q4 is in the off-state and the transistor Q5 is in the on-state. Hence in the primary winding L21 of the pulse transformer 21, the excitation current flows from the winding start to the winding end, and the primary winding L21 is excited in the reverse direction. Thereby, the voltage of the winding start of the first secondary winding L22 in the pulse transformer 21 becomes a negative pulse voltage. On the other hand, the voltage of the winding end of the second secondary winding L23 in the pulse transformer 21 becomes a positive pulse voltage.

While the PWM pulse 1 and the PWM pulse 2 are both at the low level after the shift of the PWM pulse 2 to the low level (timing T4 to T1), in the bidirectional excitation circuit 22, the transistors Q4, Q6 are in the off-state and the transistors Q5, Q7 are in the on-state. Hence the excitation current does not flow in the primary winding L21 of the pulse transformer 21. Thereby, the voltage of the winding start of the first secondary winding L22 in the pulse transformer 21 and the voltage of the winding end of the second secondary winding L23 in the pulse transformer 21 both become 0 V.

While the PWM Pulse 1 is at the high level (timing T1 to T2), in the first rectifier circuit 231, a current flows in the first rectifier diode D2. On the other hand, while the PWM pulse 2 is at the high level (timing T3 to T4), the direction of the current flowing in the first secondary winding L22 is the reverse direction, so that the current does not flow in the first rectifier diode D2. That is, the first rectifier diode D2 half-wave rectifies a pulse signal (L22 V (pulse transformer output voltage 1)) induced at the winding start of the first secondary winding L22 of the pulse transformer 21. Thereby, the same pulse signal as the PWM Pulse 1 is obtained (the collector-emitter voltage (VCE) of the transistor Q2).

While the PWM Pulse 2 is at the high level (timing T3 to T4), in the second rectifier circuit 232, a current flows in the second rectifier diode D3. On the other hand, while the PWM pulse 1 is at the high level (timing T1 to T2), the direction of the current flowing in the second secondary winding L23 is the reverse direction, so that the current does not flow in the second rectifier diode D3. That is, the second rectifier diode D3 half-wave rectifies a pulse signal (L23 V (pulse transformer output voltage 2)) induced at the winding end of the second secondary winding L23 of the pulse transformer 21. Thereby, the same pulse signal as the PWM pulse 2 is obtained (the collector-emitter voltage (VCE) of the transistor Q3).

By the connection between the cathode of the first rectifier diode D2 and the cathode of the second rectifier diode D3, a pulse signal to be the logical sum of the output signal of the first rectifier diode D2 and the output signal of the second rectifier diode D3 is generated. That is, a pulse signal, obtained by inverting a negative pulse of a pulse signal induced in the first secondary winding L22 of the pulse transformer 21 to a positive pulse, is generated (the gate-source voltage (VGS) of the field-effect transistor Q1). Thereby, the same pulse signal as the PWM control pulse signal generated by the PWM control circuit 25 is obtained.

During the time when the PWM pulse 1 is at the high level (timing T1 to T2), in the drawing circuit 233, the transistor Q2 is in the off-state and the transistor Q3 is in the on-state. The gate of the field-effect transistor Q1 is thus not connected to the primary-side ground GND1. Similarly, during the time when the PWM pulse 2 is at the high level (timing T3 to T4), the transistor Q2 is in the on-state and the transistor Q3 is in the off-state. The gate of the field-effect transistor Q1 is thus not connected to the primary-side ground GND1. On the other hand, during the time when the PWM pulse 1 and the PWM pulse 2 are both at the low level (timings T2 to T3, T4 to T1), in the drawing circuit 233, the transistors Q2, Q3 are both in the on-state. Thereby, the gate of the field-effect transistor Q1 is connected to the primary-side ground GND1, and the charge of the gate of the field-effect transistor Q1 is drawn (a collector current Ic of the transistors Q2, Q3).

As described above, in the insulation-type switching power supply according to the present disclosure, since the primary winding L21 of the pulse transformer 21 is alternately excited in the bidirectional manner using the first PWM pulse 1 and the second PWM pulse 2, a reset circuit for the pulse transformer 21 is not required, and even when the PWM control pulse signal generated by the PWM control circuit 25 has a switching duty ratio beyond 50%, magnetic saturation, reverse electromotive voltage, or the like does not occur in the pulse transformer 21. Therefore, according to the present disclosure, it is possible to provide, at low cost, an insulation-type switching power supply that can operate at a switching duty ratio beyond 50% and has a small size and high efficiency.

The configuration of the switching circuit 23 of the embodiment is a simple circuit configuration using two half-wave rectifier circuits (first rectifier circuit 231, second rectifier circuit 232) and is thus preferred in terms of being able to provide the insulation-type switching power supply according to the present disclosure at lower cost. Further, the configuration of the switching circuit 23 of the embodiment is an extremely simple circuit configuration using two rectifier diodes (first rectifier diode D2, second rectifier diode D3) and is thus preferred in terms of being able to provide the insulation-type switching power supply according to the present disclosure at even lower cost.

Moreover, as in the embodiment, the insulation-type switching power supply according to the present disclosure is preferably provided with the drawing circuit 233 that draws the charge of the gate of the field-effect transistor Q1 while the input signal of the first rectifier circuit 231 and the input signal of the second rectifier circuit 232 are both at the low level. By drawing the charge of the gate of the field-effect transistor Q1 while the PWM control pulse signal is at the low level, the field-effect transistor Q1 can be stably switched at a more accurate timing, to enable highly accurate PWM control.

Further, the drawing circuit 233 of the embodiment has a simple circuit configuration that turns on and off two PNP transistors (transistors Q2, Q3) by using signals induced in the first secondary winding L22 and the second secondary winding L23 of the pulse transformer 21 and is thus preferred in terms of being able to provide the insulation-type switching power supply according to the present disclosure at even lower cost. Moreover, as in the embodiment, the drawing circuit 233 is preferably provided with the resistors R3, R4 that limit the base currents of the transistors Q2, Q3. By adjusting the resistance values of the resistors R3, R4, it is possible to adjust the operation timings of the transistors Q2, Q3 so that the charge of the gate of the field-effect transistor Q1 is withdrawn at an accurate timing.

First Aspect of Present Disclosure

A first aspect of the present disclosure is an insulation-type switching power supply including: a flyback converter circuit; and a feedback control circuit that performs pulse width modulation (PWM) control of a switching element in the flyback converter circuit based on an output voltage of the flyback converter circuit. The feedback control circuit includes a PWM control circuit that generates and outputs a first PWM control pulse signal and a second PWM control pulse signal respectively by alternately extracting pulses of a PWM control pulse signal of the switching element, a transformer, a bidirectional excitation circuit that excites a primary winding of the transformer in a forward direction using the first PWM control pulse signal and excites the primary winding of the transformer in a reverse direction using the second PWM control pulse signal, and a switching circuit that generates a pulse signal by inverting a negative pulse of a pulse signal, induced in a secondary winding of the transformer, to a positive pulse and switches the switching element by using the generated pulse signal.

As thus described, a first PWM control pulse signal and a second PWM control pulse signal are generated by alternately extracting pulses of the PWM control pulse signal, and the primary winding of the transformer is alternately excited in a bidirectional manner using the first PWM control pulse signal and the second PWM control pulse signal. Then, a pulse signal is generated by inverting a negative pulse of a pulse signal, induced in the secondary winding of the transformer, to a positive pulse, so that the same pulse signal as the PWM control pulse signal generated by the PWM control circuit is obtained. Thereby, the PWM control pulse signal, generated by the PWM control circuit on the secondary side (output side) of the flyback converter circuit, is transmitted to the primary side (input side) of the flyback converter circuit via the transformer to enable the feedback control of the flyback converter circuit. In the present disclosure, since the primary winding of the transformer is alternately excited in the bidirectional manner using the first PWM control pulse signal and the second PWM control pulse signal, a reset circuit for the transformer is not required, and even when the PWM control pulse signal has a switching duty ratio beyond 50%, magnetic saturation, reverse electromotive voltage, or the like does not occur in the transformer.

Therefore, according to the first aspect of the present disclosure, it is possible to provide, at low cost, an insulation-type switching power supply that can operate at a switching duty ratio beyond 50% and has a small size and high efficiency.

Second Aspect of Present Disclosure

A second aspect of the present disclosure is, in the first aspect of the present disclosure described above, an insulation-type switching power supply in which the secondary winding of the transformer includes a first secondary winding and a second secondary winding, the switching circuit includes a first rectifier circuit that half-wave rectifies and outputs a pulse signal induced in the first secondary winding, and a second rectifier circuit that half-wave rectifies and outputs a pulse signal obtained by reversing a polarity of a pulse signal induced in the second secondary winding, and the switching circuit generates a pulse signal to be a logical sum of an output signal of the first rectifier circuit and an output signal of the second rectifier circuit, and switches the switching element by using the generated pulse signal.

In the first rectifier circuit, a pulse signal induced in the first secondary winding is half-wave rectified to obtain the same pulse signal as the first PWM control pulse signal. In the second rectifier circuit, a pulse signal, obtained by inverting the polarity of a pulse signal induced in the second secondary winding, is half-wave rectified to obtain the same pulse signal as the second PWM control pulse signal. Then, a pulse signal to be the logical sum of the output signal of the first rectifier circuit and the output signal of the second rectifier circuit is generated to obtain the same pulse signal as the PWM control pulse signal generated by the PWM control circuit.

Thereby, according to the second aspect of the present disclosure, the same pulse signal as the PWM control pulse signal generated by the PWM control circuit is obtained by the switching circuit with a simple circuit configuration using two half-wave rectifier circuits, so that it is possible to provide the insulation-type switching power supply according to the present disclosure at lower cost.

Third Aspect of Present Disclosure

A third aspect of the present disclosure is, in the second aspect of the present disclosure described above, an insulation-type switching power supply in which in the transformer, a winding end of the first secondary winding and a winding start of the second secondary winding are connected to a ground terminal of the switching element, the first rectifier circuit includes a first rectifier diode having an anode connected to a winding start of the first secondary winding and a cathode connected to a control terminal of the switching element, and the second rectifier circuit includes a second rectifier diode having an anode connected to a winding end of the second secondary winding and a cathode connected to the control terminal of the switching element.

According to the third aspect of the present disclosure, the same pulse signal as the PWM control pulse signal generated by the PWM control circuit is obtained by the rectifier circuit with an extremely simple circuit configuration using two rectifier diodes, so that it is possible to provide the insulation-type switching power supply according to the present disclosure at even lower cost.

Fourth Aspect of Present Disclosure

A fourth aspect of the present disclosure is, in the second or third aspect of the present disclosure described above, an insulation-type switching power supply in which the feedback control circuit further includes a drawing circuit that draws a charge of the control terminal of the switching element while an input signal of the first rectifier circuit and an input signal of the second rectifier circuit are both at a low level.

While the input signal of the first rectifier circuit and the input signal of the second rectifier circuit are both at the low level, the first PWM control pulse signal and the second PWM control pulse signal are both at the low level, that is, the PWM control pulse signal is at the low level. By drawing the charge of the control terminal of the switching element while the PWM control pulse signal is at the low level, the switching element can be stably switched at a more accurate timing, to enable highly accurate PWM control.

Fifth Aspect of Present Disclosure

A fifth aspect of the present disclosure is, in the fourth aspect of the present disclosure described above, an insulation-type switching power supply in which the drawing circuit includes a first PNP transistor having a base connected to the winding start of the first secondary winding and an emitter connected to the control terminal of the switching element, and a second PNP transistor having a base connected to the winding end of the second secondary winding, an emitter connected to a collector of the first PNP transistor, and a collector connected to the ground terminal of the switching element.

In the drawing circuit with such a configuration, only while the PWM control pulse signal is at the low level, the first PNP transistor and the second PNP transistor are both in the on-state, and the control terminal of the switching element is connected to the ground terminal of the switching element. Thereby, while the PWM control pulse signal is at the low level, it is possible to draw the charge of the control terminal of the switching element. According to the fifth aspect of the present disclosure, it is possible to provide the insulation-type switching power supply according to the present disclosure at even lower cost due to the drawing circuit with a simple circuit configuration that turns on and off two PNP transistors by using signals induced in the first secondary winding and the second secondary winding of the transformer.

Sixth Aspect of Present Disclosure

A sixth aspect of the present disclosure is, in the fifth aspect of the present disclosure described above, an insulation-type switching power supply in which in the drawing circuit, current-limiting resistors are respectively provided between the winding start of the first secondary winding and the base of the first PNP transistor and between the winding end of the second secondary winding and the base of the second PNP transistor.

According to the sixth aspect of the present disclosure, by adjusting the resistance values of the current-limiting resistors, it is possible to adjust the operation timings of the first PNP transistor and the second PNP transistor so that the charge of the control terminal of the switching element is withdrawn at an accurate timing.

Seventh Aspect of Present Disclosure

A seventh aspect of the present disclosure is, in the fourth aspect of the present disclosure described above, an insulation-type switching power supply in which the drawing circuit includes a first PNP transistor having a base connected to the winding end of the second secondary winding and an emitter connected to the control terminal of the switching element, and a second PNP transistor having a base connected to the winding start of the first secondary winding, an emitter connected to a collector of the first PNP transistor, and a collector connected to the ground terminal of the switching element.

According to the seventh aspect of the present disclosure, similarly to the fifth aspect of the present disclosure, it is possible to provide the insulation-type switching power supply according to the present disclosure at even lower cost due to the drawing circuit with a simple circuit configuration that turns on and off two PNP transistors by using signals induced in the first secondary winding and the second secondary winding of the transformer.

Eighth Aspect of Present Disclosure

An eighth aspect of the present disclosure is, in the seventh aspect of the present disclosure described above, an insulation-type switching power supply in which in the drawing circuit, current-limiting resistors are respectively provided between the winding start of the first secondary winding and the base of the second PNP transistor and between the winding end of the second secondary winding and the base of the first PNP transistor.

According to the eighth aspect of the present disclosure, similarly to the sixth aspect of the present disclosure, by adjusting the resistance values of the current-limiting resistors, it is possible to adjust the operation timings of the first PNP transistor and the second PNP transistor so that the charge of the control terminal of the switching element is withdrawn at an accurate timing.

Ninth Aspect of Present Disclosure

A ninth aspect of the present disclosure is, in the fourth aspect of the present disclosure described above, an insulation-type switching power supply in which the drawing circuit includes a first p-channel field-effect transistor having a gate connected to the winding start of the first secondary winding and a source connected to the control terminal of the switching element, and a second p-channel field-effect transistor having a gate connected to the winding end of the second secondary winding, a source connected to a drain of the first p-channel field-effect transistor, and a drain connected to the ground terminal of the switching element.

According to the ninth aspect of the present disclosure, similarly to the fifth aspect of the present disclosure, it is possible to provide the insulation-type switching power supply according to the present disclosure at even lower cost due to the drawing circuit with a simple circuit configuration that turns on and off two p-channel field-effect transistors by using signals induced in the first secondary winding and the second secondary winding of the transformer.

Tenth Aspect of Present Disclosure

A tenth aspect of the present disclosure is, in the ninth aspect of the present disclosure described above, an insulation-type switching power supply in which in the drawing circuit, current-limiting resistors are respectively provided between the winding start of the first secondary winding and the gate of the first p-channel field-effect transistor and between the winding end of the second secondary winding and the gate of the second p-channel field-effect transistor.

According to the tenth aspect of the present disclosure, similarly to the sixth aspect of the present disclosure, by adjusting the resistance values of the current-limiting resistors, it is possible to adjust the operation timings of the first p-channel field-effect transistor and the second p-channel field-effect transistor so that the charge of the control terminal of the switching element is withdrawn at an accurate timing.

Eleventh Aspect of Present Disclosure

An eleventh aspect of the present disclosure is, in the fourth aspect of the present disclosure described above, an insulation-type switching power supply in which the drawing circuit includes a first p-channel field-effect transistor having a gate connected to the winding end of the second secondary winding and a source connected to the control terminal of the switching element, and a second p-channel field-effect transistor having a gate connected to the winding start of the first secondary winding, a source connected to a drain of the first p-channel field-effect transistor, and a drain connected to the ground terminal of the switching element.

According to the eleventh aspect of the present disclosure, similarly to the fifth aspect of the present disclosure, it is possible to provide the insulation-type switching power supply according to the present disclosure at even lower cost due to the drawing circuit with a simple circuit configuration that turns on and off two p-channel field-effect transistor by using signals induced in the first secondary winding and the second secondary winding of the transformer.

Twelfth Aspect of Present Disclosure

A twelfth aspect of the present disclosure is, in the eleventh aspect of the present disclosure described above, an insulation-type switching power supply in which in the drawing circuit, current-limiting resistors are respectively provided between the winding start of the first secondary winding and the gate of the second p-channel field-effect transistor and between the winding end of the second secondary winding and the gate of the first p-channel field-effect transistor.

According to the twelfth aspect of the present disclosure, similarly to the sixth aspect of the present disclosure, by adjusting the resistance values of the current-limiting resistors, it is possible to adjust the operation timings of the first p-channel field-effect transistor and the second p-channel field-effect transistor so that the charge of the control terminal of the switching element is withdrawn at an accurate timing.

EXPLANATION OF REFERENCE SIGNS

10 flyback converter circuit
20 feedback control circuit
21 pulse transformer
22 bidirectional excitation circuit
23 switching circuit
24 driver
25 PWM control circuit 231 first rectifier circuit
232 second rectifier circuit
233 drawing circuit

The invention claimed is:

1. An insulation-type switching power supply comprising:
a flyback converter circuit; and
a feedback control circuit that performs pulse width modulation (PWM) control of a switching element in the flyback converter circuit based on an output voltage of the flyback converter circuit,
wherein the feedback control circuit includes
a PWM control circuit that generates and outputs a first PWM control pulse signal and a second PWM control pulse signal respectively by alternately extracting pulses of a PWM control pulse signal of the switching element,
a transformer,
a bidirectional excitation circuit that excites a primary winding of the transformer in a forward direction using the first PWM control pulse signal and excites the primary winding of the transformer in a reverse direction using the second PWM control pulse signal, and
a switching circuit that generates a switching pulse signal by inverting a negative pulse of a pulse signal, induced in a secondary winding of the transformer, to a positive pulse and switches the switching element by using the generated switching pulse signal.

2. The insulation-type switching power supply according to claim 1, wherein
the secondary winding of the transformer includes a first secondary winding and a second secondary winding,
the switching circuit includes
a first rectifier circuit that half-wave rectifies and outputs a first pulse signal induced in the first secondary winding, and
a second rectifier circuit that half-wave rectifies and outputs a second pulse signal obtained by reversing a polarity of an induced pulse signal induced in the second secondary winding, and
the switching circuit generates the switching pulse signal to be a logical sum of an output signal of the first rectifier circuit and an output signal of the second rectifier circuit, and switches the switching element by using the generated switching pulse signal.

3. The insulation-type switching power supply according to claim 2, wherein
in the transformer, a winding end of the first secondary winding and a winding start of the second secondary winding are connected to a ground terminal of the switching element,
the first rectifier circuit includes a first rectifier diode having an anode connected to a winding start of the first secondary winding and a cathode connected to a control terminal of the switching element, and
the second rectifier circuit includes a second rectifier diode having an anode connected to a winding end of the second secondary winding and a cathode connected to the control terminal of the switching element.

4. The insulation-type switching power supply according to claim 3, wherein
the feedback control circuit further includes a drawing circuit that draws a charge of the control terminal of the switching element while an input signal of the first rectifier circuit and an input signal of the second rectifier circuit are both at a low level.

5. The insulation-type switching power supply according to claim 4, wherein the drawing circuit includes
a first PNP transistor having a base connected to the winding start of the first secondary winding and an emitter connected to the control terminal of the switching element, and
a second PNP transistor having a base connected to the winding end of the second secondary winding, an emitter connected to a collector of the first PNP transistor, and a collector connected to the ground terminal of the switching element.

6. The insulation-type switching power supply according to claim 5, wherein in the drawing circuit, current-limiting resistors are respectively provided between the winding start of the first secondary winding and the base of the first PNP transistor and between the winding end of the second secondary winding and the base of the second PNP transistor.

7. The insulation-type switching power supply according to claim 4, wherein the drawing circuit includes
a first PNP transistor having a base connected to the winding end of the second secondary winding and an emitter connected to the control terminal of the switching element, and
a second PNP transistor having a base connected to the winding start of the first secondary winding, an emitter connected to a collector of the first PNP transistor, and a collector connected to the ground terminal of the switching element.

8. The insulation-type switching power supply according to claim 7, wherein in the drawing circuit, current-limiting resistors are respectively provided between the winding start of the first secondary winding and the base of the second PNP transistor and between the winding end of the second secondary winding and the base of the first PNP transistor.

9. The insulation-type switching power supply according to claim 4, wherein the drawing circuit includes
a first p-channel field-effect transistor having a gate connected to the winding start of the first secondary winding and a source connected to the control terminal of the switching element, and
a second p-channel field-effect transistor having a gate connected to the winding end of the second secondary winding, a source connected to a drain of the first p-channel field-effect transistor, and a drain connected to the ground terminal of the switching element.

10. The insulation-type switching power supply according to claim 9, wherein in the drawing circuit, current-limiting resistors are respectively provided between the winding start of the first secondary winding and the gate of the first p-channel field-effect transistor and between the winding end of the second secondary winding and the gate of the second p-channel field-effect transistor.

11. The insulation-type switching power supply according to claim 4, wherein the drawing circuit includes
a first p-channel field-effect transistor having a gate connected to the winding end of the second secondary winding and a source connected to the control terminal of the switching element, and
a second p-channel field-effect transistor having a gate connected to the winding start of the first secondary winding, a source connected to a drain of the first p-channel field-effect transistor, and a drain connected to the ground terminal of the switching element.

12. The insulation-type switching power supply according to claim 11, wherein in the drawing circuit, current-limiting resistors are respectively provided between the winding start of the first secondary winding and the gate of the second p-channel field-effect transistor and between the winding end of the second secondary winding and the gate of the first p-channel field-effect transistor.

* * * * *